United States Patent
Zhao et al.

(10) Patent No.: US 9,256,105 B2
(45) Date of Patent: Feb. 9, 2016

(54) BENDED LIQUID CRYSTAL DISPLAY AND ITS MANUFACTURING METHOD AND APPARATUS

(71) Applicant: BOE TECHNOLOGY GROUP CO., LTD., Beijing (CN)

(72) Inventors: Dejiang Zhao, Beijing (CN); Yujun Zhang, Beijing (CN); Chao Liu, Beijing (CN); Zhongyuan Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 161 days.

(21) Appl. No.: 13/877,504

(22) PCT Filed: Oct. 29, 2012

(86) PCT No.: PCT/CN2012/083714
§ 371 (c)(1),
(2) Date: Apr. 3, 2013

(87) PCT Pub. No.: WO2013/166813
PCT Pub. Date: Nov. 14, 2013

(65) Prior Publication Data
US 2014/0063434 A1    Mar. 6, 2014

(30) Foreign Application Priority Data

May 11, 2012 (CN) .......................... 2012 1 0147749

(51) Int. Cl.
*G02F 1/1333* (2006.01)
*G02F 1/1339* (2006.01)
(Continued)

(52) U.S. Cl.
CPC .............. *G02F 1/1339* (2013.01); *B23B 27/00* (2013.01); *B32B 17/06* (2013.01); *G02F 1/1341* (2013.01); *G02F 1/133305* (2013.01)

(58) Field of Classification Search
CPC .................. G02F 1/1333; G02F 2001/133354; G02F 2001/133302; G02F 2001/133368; G02F 1/1303; G02F 1/1341; G02F 1/133351; G02F 2202/28; G02F 1/133; G02F 1/1342; H01L 51/56; H01L 51/5246; H01L 51/524

USPC ............ 349/153, 158, 160, 189, 190; 445/25, 445/73; 348/86, 95, 190
See application file for complete search history.

(56) References Cited

U.S. PATENT DOCUMENTS

| | | | |
|---|---|---|---|
| 5,273,475 A | | 12/1993 | Oshikawa |
| 6,043,858 A | * | 3/2000 | Koike et al. ................... 349/110 |

(Continued)

FOREIGN PATENT DOCUMENTS

| | | |
|---|---|---|
| CN | 2676239 Y | 2/2005 |
| CN | 1896806 A | 1/2007 |

(Continued)

OTHER PUBLICATIONS

First Office Action dated Mar. 5, 2013 issued by State Intellectual Property Office of the People's Republic of China in connection with Chinese counterpart application, Chinese National Application No. 201210147749.X, English portions only.

(Continued)

*Primary Examiner* — Paisley L Arendt
*Assistant Examiner* — Angela Davison

(57) ABSTRACT

Embodiments of the present invention disclose a bended liquid crystal display and a manufacturing method and apparatus therefore. The method comprises: preparing an array substrate and a color filter substrate with flat glass sheets having different thermal expansion coefficients; applying adhesive sealant at edges of surfaces of the array substrate and/or the color filter substrate; heating the array substrate and the color filter substrate, and binding the expanded array substrate and color filter substrate together, to form an assembled substrate; and cooling the assembled substrate and forming a bended assembled substrate having a degree of curvature. The bended liquid crystal display has a better stability, and has no variation in its degree of curvature over service time.

9 Claims, 7 Drawing Sheets

(51) Int. Cl.
   *G02F 1/1341* (2006.01)
   *B23B 27/00* (2006.01)
   *B32B 17/06* (2006.01)
   *H01J 9/24* (2006.01)
   *H01J 9/26* (2006.01)
   *H01J 9/32* (2006.01)

(56) References Cited

U.S. PATENT DOCUMENTS

| | | | | |
|---|---|---|---|---|
| 7,568,961 | B2 * | 8/2009 | Kim | ............................ 445/24 |
| 2009/0185127 | A1 | 7/2009 | Tanaka et al. | |
| 2014/0063434 | A1 | 3/2014 | Zhao et al. | |

FOREIGN PATENT DOCUMENTS

| | | | |
|---|---|---|---|
| CN | 101216635 | A | 7/2008 |
| CN | 101496082 | A | 7/2009 |
| CN | 101625474 | A | 1/2010 |
| CN | 101776820 | A | 7/2010 |
| CN | 102707474 | A | 10/2012 |
| JP | 57-191617 | A | 11/1982 |
| JP | 50-040269 | A | 2/1993 |
| JP | 2001-042349 | A | 2/2001 |

OTHER PUBLICATIONS

English translation of First Office Action dated Mar. 5, 2013 issued by State Intellectual Property Office of the People's Republic of China in connection with Chinese counterpart application, Chinese National Application No. 201210147749.X.

Second Office Action dated Apr. 26, 2013 (most recent office action prior to the decision to grant a patent) issued by State Intellectual Property Office of the People's Republic of China in connection with Chinese counterpart application, Chinese National Application No. 201210147749.X, English portions only.

English translation of Second Office Action dated Apr. 26, 2013 (most recent office action prior to the decision to grant a patent) issued by State Intellectual Property Office of the People's Republic of China in connection with Chinese counterpart application, Chinese National Application No. 201210147749.X.

Notification to Grant the Patent Right dated Jun. 6, 2013 issued by State Intellectual Property Office of the People's Republic of China in connection with Chinese counterpart application, Chinese National Application No. 201210147749.X, English portions only.

English translation of Notification to Grant the Patent Right dated Jun. 6, 2013 issued by State Intellectual Property Office of the People's Republic of China in connection with Chinese counterpart application, Chinese National Application No. 201210147749.X.

English machine translation of Chinese Patent Document No. CN 101216635 A (above), from machine translation feature of LexisNexis TotalPatent.

English translation of Abstract of Chinese Patent Document No. CN 101216635 A (above).

English machine translation of Chinese Patent Document No. CN 101776820 A (above), from machine translation feature of LexisNexis TotalPatent.

English translation of Abstract of Chinese Patent Document No. CN 101776820 A (above).

English machine translation of Chinese Patent Document No. CN 101625474 A (above), from machine translation feature of LexisNexis TotalPatent.

English translation of Abstract of Chinese Patent Document No. CN 101625474 A (above).

English machine translation of Japanese Patent Document No. JP 2001-042349 A (above), from machine translation feature of Japan Patent Office.

State Intellectual Property Office of the People's Rebulic of China ("SIPO"), PCT International Search Report dated Feb. 7, 2013 (Chinese language), in priority International Application No. PCT/CN2012/083714, English portions only.

PCT International Search Report dated Feb. 7, 2013 (English language translation), in priority International Application No. PCT/CN2012/083714.

English machine translation of Chinese Patent Document No. CN 101216635 A (above), from machine translation feature of LexisNexis' TotalPatent software.

English machine translation of Japanese Patent Document No. JP 50-040269 A (above), from machine translation feature of Japan Patent Office.

English machine translation of Chinese Patent Document No. CN 2676239 Y (above), from machine translation feature of LexisNexis' TotalPatent software.

English translation of Abstract of Chinese Patent Document No. CN 2676239 Y (above).

English translation of Abstract of Japanese Patent Document No. JP 57-191617 A (above).

International Preliminary Report on Patentability, in PCT Application No. PCT/CN2012/083714, dated Nov. 11, 2014, 13 pages.

\* cited by examiner

BENDED LIQUID CRYSTAL DISPLAY AND ITS MANUFACTURING METHOD AND APPARATUS

CROSS REFERENCE TO RELATED APPLICATIONS

This application is based on International Application No. PCT/CN2012/083714 filed on Oct. 29, 2012, which claims priority to Chinese National Application No. 201210147749.X filed on May 11, 2012. The entire contents of each and every foregoing application are incorporated herein by reference.

TECHNICAL FIELD

Embodiment of the present invention relates to a bended liquid crystal display and a manufacturing method and apparatus.

BACKGROUND

Liquid crystal displays have become one kind of the mainstream display devices due to the advantages of light weight, thin profile, etc. At present, vast majority of liquid crystal displays are flat because glass sheet materials are mostly used. However, in some special application areas, such as the application situations in which advertisement displays are mounted on an arc-shaped wall, a curved display is typically required. For the limitations on properties of glass sheet materials, it's highly difficult to make a bended liquid crystal display.

In an existing method for manufacturing a bended liquid crystal display, some use resin type material capable of being bended for a substrate, some employ a process in which a film is attached onto the surface of a glass sheet so as to bend the glass sheet due to acting force from the film. However, because in the bended displays manufactured in these methods the bending of the substrates is not rigid and bad in stability, the degree of curvature of the display will also vary over service time.

SUMMARY

Embodiments of the present invention provide a bended liquid crystal display and a manufacturing method and apparatus for manufacturing a liquid crystal display of a certain degree of curvature and stable flexibility property.

One aspect of the present invention provides a method for manufacturing a bended liquid crystal display, comprising: preparing an array substrate with a flat glass sheet having a first thermal expansion coefficient and preparing a color filter substrate with a flat glass sheet having a second thermal expansion coefficient, the first thermal expansion coefficient being different from the second thermal expansion coefficient; applying adhesive sealant at edges of surfaces of the array substrate and/or the color filter substrate; heating the array substrate and the color filter substrate, and when it's determined that both the array substrate and the color filter substrate have been subjected to thermal expansion and reach a same predetermined length and width, binding the expanded array substrate and color filter substrate together with the adhesive sealant so as to form an assembled substrate; and cooling the assembled substrate and forming a bended assembled substrate having a degree of curvature.

Another aspect of the present invention provides a bended liquid crystal display, comprising: an array substrate and a color filter substrate which have an identical degree of curvature and are made from flat glass sheets having different thermal expansion coefficients, as well as liquid crystal sandwiched between the array substrate and the color filter substrate.

Another aspect of the present invention provides a liquid crystal filling apparatus, adapted for filling liquid crystal to a bended liquid crystal display, comprising: one or more curved liquid crystal troughs having a preset degree of curvature.

Another aspect of the present invention provides a trimming and sealing apparatus, adapted for trimming and sealing an bended liquid crystal display, comprising: one or more pair of curved pressing plates, wherein the curved pressing plate has a same degree of curvature as that of the bended liquid crystal display.

Another aspect of the present invention provides a backlight source, adapted for affording backlight for a bended liquid crystal display, comprising: a curved light guiding plate having a same degree of curvature as that of the bended liquid crystal display.

Embodiments of the present invention utilize phenomenon that two flat glass sheets of different thermal expansion coefficients can generate different stress during cooling contraction, which can be used to obtain a liquid crystal display of a certain degree of curvature. Because, in the embodiment of the present invention, binding is performed only when both the flat array substrate and the flat color filter substrate reach the same length and width, which is essentially similar to the manufacturing technology for an existing liquid crystal display, mass production for the bended liquid crystal display can be performed without excessive modification on the existing production equipments; furthermore, because the array substrate and the color filter substrate are curved in a stiffness way, the produced bended liquid crystal display is of good stability and will not vary in its degree of curvature over service time.

BRIEF DESCRIPTION OF THE DRAWINGS

In order to illustrate the technical solution of the embodiment of the present invention more clearly, a simply introduction about the drawings of the embodiments will be made in the following, and obviously, the drawings described later relate to only some embodiments of the present invention, rather than limitation to the present invention.

DETAILED DESCRIPTION

Figure 1:
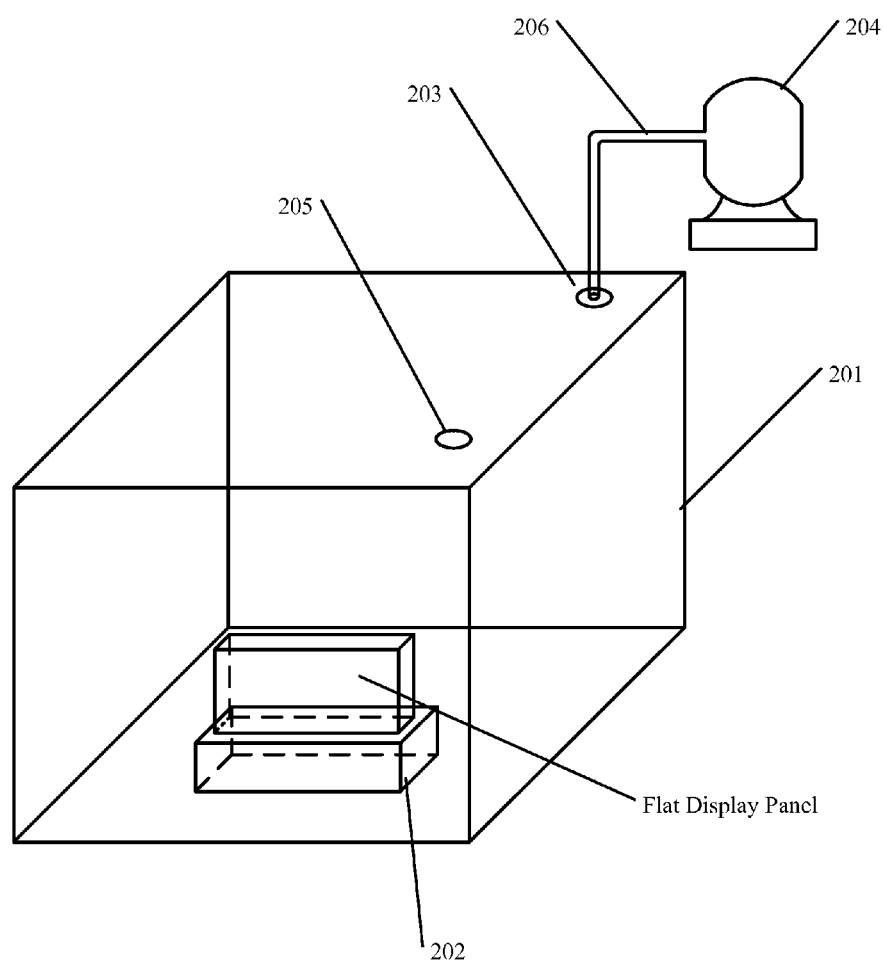
FIG. 1 is a structural schematic view for the liquid crystal filling apparatus adapted for manufacturing an existing flat liquid crystal display.

To make clearer the aim, technical solutions and advantages of the embodiments of present invention, a clear and complete description about the technical solution of the embodiment of the present invention will be made with reference to the accompanying drawings of the embodiments of present invention. Obviously, the described embodiments are merely part of the embodiments of the present invention, but not all the embodiments. Based on the described embodiments of present invention, all the other embodiments acquired by the ordinary skilled in this art, without any creative labor, fall into the protection scope of the present invention.

Next, detailed description will be made about the bended liquid crystal display and a manufacturing method and apparatus therefore provided by the embodiments of the present invention in connection with the accompanying drawings.

One embodiment of the present invention provides a method for manufacturing a bended liquid crystal display, and the method comprises steps as follows. Step 101, preparing an array substrate with a flat glass sheet having a first thermal expansion coefficient and preparing a color filter substrate with a flat glass sheet having a second thermal expansion coefficient, the first thermal expansion coefficient being different from the second thermal expansion coefficient; Step 102, applying adhesive sealant at edges of the surfaces of the array substrate and/or the color filter substrate; Step 103, heating the array substrate and the color filter substrate, and when it's determined that both the array substrate and the color filter substrate have been subjected to thermal expansion and reach a same predetermined length and width, binding the expanded array substrate and color filter substrate together with the adhesive sealant so as to form an assembled substrate; and Step 104, cooling the assembled substrate and forming a bended assembled substrate of a degree of curvature. The method of this embodiment utilizes such a phenomenon that two flat glass sheets of different thermal expansion coefficients cause different stress upon cooling contraction. Firstly, the method uses two flat glass sheets of different thermal expansion coefficients for preparing an array substrate and a color filter substrate, then heats the array substrate and the color filter substrate of different thermal expansion coefficients, binds both substrates together to form a liquid crystal cell when they expand to a preset length and width, and finally, cools the liquid crystal cell formed of the two substrates and thus obtains a liquid crystal display of a certain degree of curvature. In the present method, the binding process is performed only when both the array and color filter substrates, which are planar, reach the same length and width, and this process is essentially similar to the existing manufacturing technology for liquid crystal displays, mass production for the bended liquid crystal displays can be performed without large modification on the existing production equipments; further, due to the fact that both the array substrate and the color filter substrate are curved in a rigidness way, the produced bended liquid crystal displays are in good stability and the degree of curvature will not vary over service time.

In the present disclosure, thermal expansion coefficient refers to a coefficient involving phenomenon that the geometrical features of an object vary along with the temperature variation under the thermal expansion and shrinking effect. In most cases, the thermal expansion coefficient of an object is positive, that is, its volume increases when the temperature increases. As for a glass sheet which is an article that can be approximately considered as a plain, its length and width are determinative factors determining its volume (its thickness is less important and negligible). Then, in this case the thermal expansion coefficient can also be called as linear expansion coefficient, which specifically means the ratio of the increment of length or width to the original length or width per unit variation of temperature.

As mentioned in the embodiment of the present invention, the case where the array substrate and the color filter substrate made from the glass sheets of different coefficients of expansion reach preset length and width means that the lengths of the array substrate and the color filter substrate reach a similar preset length and furthermore the widths thereof reach a similar preset width.

It should be noted, the thermal expansion coefficient of the array substrate in this disclosure refers to the thermal expansion coefficient of the flat glass sheet used for preparing the array substrate; and the thermal expansion coefficient of the color filter substrate mentioned in this disclosure refers to the thermal expansion coefficient of the flat glass sheet used for preparing the color filter substrate.

In the method according to the embodiment of the present invention, in order to manufacture a liquid crystal display of a preset degree of curvature, the degree of curvature can be preset and the initial length and initial width for the array substrate and the color filter substrate can be determined depending on the degree of curvature. Particularly, the degree of curvature of the curved display is determined by the length and width of the two resultant substrates. For example, when the resultant color filter substrate has a length and width greater than the length and width of the resultant array substrate, respectively, the color filter substrate will concave toward the array substrate after the liquid crystal cell is formed and cooled, and the greater the difference of the length and width values between the two substrates is, the greater the degree of curvature is; in addition, the array substrate and the color filter substrate made from glass sheets, after the procedure of thermal expansion and shrinking, have the length and width sizes not greatly different from the initial sizes. Based on the above characteristics, before preparation of a bended liquid crystal display, the required degree of curvature can be preset, and the initial length and initial width of the array substrate and the color filter substrate can be determined respectively based on the degree of curvature. In this way, because the resultant color filter substrate and array substrate have the length and width sizes not greatly different from the initial length and width sizes, it's possible to obtain a display with satisfying the degree of curvature. It should be noted, the method for manufacturing a bended liquid crystal display provided by the embodiment of the present invention is described with the above steps, but this does not mean that the method of the present invention comprises only the above steps. In other examples, the method may also include various other necessary steps for achieving the manufacture of a liquid crystal display, such as forming an alignment film, spraying spacers etc. The method provided by the embodiment of the present invention has no limitation about other steps than the above steps, that is, is not limited by the specific implementation manners of the other steps. Preferably, in the method according to an embodiment of the present invention, the adhesive sealant is thermosetting adhesive sealant.

In the existing technology for making a display, the main component of commonly used adhesive sealant is resin, and the adhesive sealant may be classified into two basic types, that is, thermosetting adhesive sealant and photo-curable adhesive sealant. Thermosetting adhesive sealant is cured by heating and has higher adhesive strength, while photo-curable adhesive sealant is cured by light illumination and has lower adhesive strength. In the method according to the embodiment of the present invention, it's preferable to employ thermosetting adhesive sealant to guarantee a higher adhesive force between the array substrate and the color filter substrate after binding, and further guarantee a better binding effect between the two substrates that bound together during the subsequent cooling process, thus ensuring the quality of the produced bended liquid crystal display. In addition, since heating of the array substrate and the color filter substrate is necessary in the method according to the embodiment of the present invention, the heating process may be used to cure the thermosetting adhesive sealant coated in the invention.

Preferably, in the method according to an embodiment of the present invention, the heating temperature is from 80 to 300 degrees Celsius.

Specifically, in the method of the embodiment of the present invention, when the array substrate and the color filter substrate are heated, the heating temperature is preferably in a range of 80-300 degrees Celsius so as to avoid damaging the performance of various functional units in the array substrate and the color filter substrate (e.g., the thin film transistor (TFT) serving as a switching element for each pixel unit in the array substrate), and ensure the cure of the adhesive sealant. Otherwise, excessively high temperature will damage the performance of various functional units in the array substrate and the color filter substrate, but excessively low temperature can not realize the cure of the adhesive sealant.

Specifically, the specific value of the required heating temperature, when both the substrates reach a same predetermined length and width, which should be in a range of 80-300 degrees Celsius, may be determined based on the thermal expansion coefficients, initial length and initial width of the array substrate and the color filter substrate.

The expansion extents in volume of the array substrate and the color filter substrate which have certain thermal expansion coefficients have a direct correlation with the heating temperature. When the thermal expansion coefficients of both the substrates are determined, it's necessary to strictly control the heating temperature, such that both the glass sheets can reach a same predetermined length and width from their respective initial length and width after the thermal expansion.

It should be noted that, the array substrate and the color filter substrate described in the embodiment of the present invention can be separately heated under different temperature, and also may be heated under the identical temperature. The embodiment of the present invention has no restriction on the ways of heating both the substrates under identical temperature as long as the object of expansion of the present invention is achieved.

Preferably, in the method according to the embodiment of the present invention, the adhesive sealant is used for binding the expanded array substrate and color filter substrate together to form an assembled substrate and obtain a liquid crystal cell. For example, the alignment mark on the expanded array substrate is aligned with the alignment mark on the expanded color filter substrate and the adhesive sealant is used for binding the expanded array substrate and color filter substrate together to form an assembled substrate.

Specifically, prior to manufacturing of the bended liquid crystal display, all-around consideration would better be made on the variation of positions of the alignment marks on the array substrate and the color filter substrate, which is caused by the change in volume during thermal expansion. In the method according to the embodiment of the present invention, for the purpose of eventually obtaining a bended liquid crystal display having a fine display effect, the alignment marks on both substrates should be ensured to be aligned with each other when both substrates expand to the identical preset length and width, so that the cell-assembling process (that is, binding both substrates together with the adhesive sealant) can be successfully completed.

For example, based on the consideration of the variation in volume of the array substrate and the color filter substrate during thermal expansion and thus-caused position variation of the alignment marks on both substrates, in order to successfully complete the cell-assembling process when both substrates reach the identical preset length and width during the manufacture of the array substrate and the color filter substrate, it's possible to calculate the position variation of the alignment mark on respective substrate when the substrates expand to the preset length and width from their initial length and width depending on the thermal expansion coefficients of the used glass sheets, and further, determine the initial positions of the alignment marks on both substrates accordingly based on the position variation of the alignment marks, such that the alignment marks on both substrates can align with each other when the substrates reach the identical preset length and width. Alternatively, prior to manufacturing of the bended liquid crystal display, it's possible to separately simulate the position variation of the alignment marks on both substrates during their thermal expansion with a simulation software and determine the initial positions of the alignment marks on both substrates based on the simulation process, so that the alignment marks on both substrates can align with each other when the substrates reach the identical preset length and width to successfully complete the cell-assembling process.

Preferably, in the method of the embodiment of the present invention, the adhesive sealant is used for binding the expanded array substrate and color filter substrate together, and the pixel electrodes on the expanded array substrate align with the color filters on the expanded color filter substrate.

The minimal display unit of a display device is pixel, and for each pixel, there is provided a pixel electrode on the array substrate and a color filter on the color filter substrate, and the pixel electrode and the color filter for each pixel should cooperate to realize the effect of color variation. When the method for manufacturing the bended liquid crystal display provided by the embodiment of the present invention is practiced, an all-around consideration of the change in volume of the array substrate and the color filter substrate during their thermal expansion and thus-caused position variations of the pixel electrodes on the array substrate and the color filters on the color filter substrate, and to eventually obtain a bended liquid crystal display having better display effect, the embodiment of the present invention should ensure the alignment of the pixel electrodes on the array substrate with the respective color filters on the color filter substrate when both substrates expand to the identical preset length and width, and in this way a bended liquid crystal display of normal presentation function can be obtained accordingly.

For example, in consideration of the variation in volume of the array substrate and the color filter substrate during thermal expansion and thus-caused position variation corresponding to each pixel on the substrates, in order to make the pixel electrode and the color filter corresponding to a same pixel align with each other when both substrates reach the identical preset length width during the manufacture of the array substrate and the color filter substrate, it's possible to calculate the position variation of the pixel electrode and color filter corresponding to each pixel when both substrates expand to the preset length and width from their initial length and width based on the thermal expansion coefficients of the used glass sheets, and further, determine the initial positions of the pixel electrode on the array substrate and the color filter substrate on the color filter substrate, respectively, according to the position variation, such that the pixel electrode and color filter corresponding to the same pixel can align with each other when the substrates reach the identical preset length and width; alternatively, it's possible to separately simulate the position variation of the pixel electrode and color filter corresponding to each pixel during the thermal expansion of the array substrate and the color filter substrate with a simulation software, and determine the initial position of the pixel electrode on the array substrate and that of the color filter on the color filter substrate based on the simulation process, so that both of them can align with each other when the substrates reach the identical preset length and width.

Preferably, in the method of the embodiment of the present invention, the cooling process is natural cooling.

For example, in order that the expanded array substrate and color filter substrate can produce preset curvature deformation, the method of the embodiment of the present invention employs natural cooling.

For example, the method of the embodiment of the present invention further comprises: filling liquid crystal into the bended assembled substrate.

For example, in the method of the embodiment of the present invention, the liquid crystal is filled into the bended assembled substrate. Also for example, liquid crystal filling apparatus having a curved liquid crystal trough is used for filling liquid crystal into the bended assembled substrate, and the curved liquid crystal trough has trough walls of a preset degree of curvature.

In an existing technology for preparing a liquid crystal display, the common liquid crystal filling apparatuses involve flat liquid crystal display. FIG. 1 is a structural schematic view of an existing liquid crystal filling apparatus, and the liquid crystal filling apparatus comprises: a liquid crystal filling case 201, a liquid crystal trough 202, an extraction hole 203, an air pump 204, a vent hole 205, an extracting pipe 206 etc.; the liquid crystal trough 202 for containing liquid crystal is cuboid-shaped. Because the price of liquid crystal is high, the liquid crystal trough 202 is generally small in volume and used for containing only liquid crystal in a volume slightly greater than that required by the liquid crystal display. The technology of filling liquid crystal into a flat liquid crystal display with the liquid crystal filling apparatus shown in FIG. 1 comprises: evacuating the liquid crystal filling case 201 through the extracting pipe 206 and the extraction hole 203 using the air pump 204, then placing the flat display to be filled with liquid crystal into the liquid crystal filling case 201, and immersing the injection mouth of the flat display into the liquid crystal trough 202 filled with liquid crystal, and finally, opening the vent hole 205 such that the liquid crystal filling case 201 is filled with an appropriate amount of air, thereby the liquid crystal in the liquid crystal trough 202 enters the flat display through the injection mouth by the atmosphere pressure and due to capillarity phenomenon.

In an embodiment of the present invention, when a liquid crystal display of a certain degree of curvature is prepared, if the liquid crystal filling apparatus shown in FIG. 1 is used for carrying out liquid crystal filling for the liquid crystal display, the process of liquid crystal filling may not be successfully completed since the liquid crystal trough 202 is cuboid-shaped and it is very likely that waste of the liquid crystal occurs. Therefore, in the method of the embodiment of the present invention, a liquid crystal filling apparatus having a curved liquid crystal trough is necessary for the process of liquid crystal filling in the course of manufacturing the bended liquid crystal display. The trough walls of the curved liquid crystal trough have a certain degree of curvature, and the degree of curvature should satisfy the requirement for carrying out the liquid crystal filling to the bended assembled substrate, and may be slightly greater than or less than the degree of curvature of the bended assembled substrate. For example, the preset degree of curvature is same as that of the bended assembled substrate. For example, for the purpose of depressing waste of the liquid crystal while performing liquid crystal filling to the bended liquid crystal display, the degree of curvature of the trough walls is made exactly equal to that of the bended assembled substrate, that is to say, when the bended assembled substrate is put into the curved liquid crystal trough for liquid crystal filling, the trough walls are microscopically parallel to the bended assembled substrate. For example, the method of the embodiment of the present invention further comprises: trimming and sealing the bended assembled substrate after the liquid crystal filling. For example, in the method of the embodiment of the present invention, the bended assembled substrate after the liquid crystal filling is trimmed and sealed. For example, a trimming and sealing apparatus having a curved pressing plate is used for trimming and sealing the bended assembled substrate after being filled with liquid crystal, and the curved pressing plate has a same degree of curvature as that of the bended assembled substrate.

Figure 2:
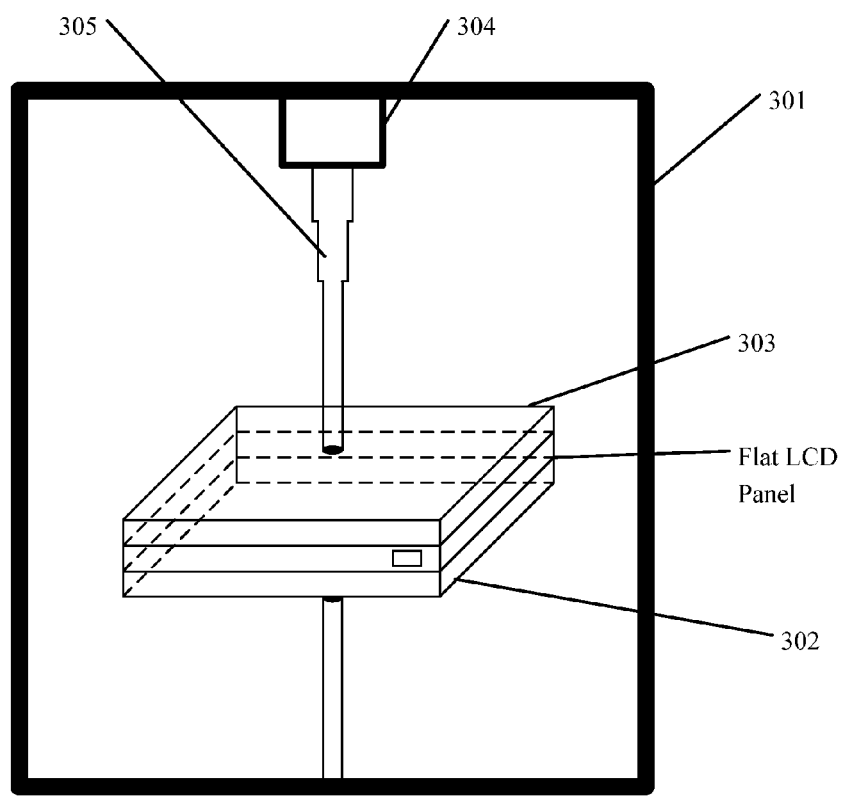
FIG. 2 is a structural schematic view for the trimming and sealing apparatus adapted for manufacturing the existing flat liquid crystal display.

In the existing technology for preparing a liquid crystal display, all of the common trimming and sealing apparatuses involves flat liquid crystal displays. FIG. 2 is a structural schematic view of an existing trimming and sealing apparatus, the trimming and sealing apparatus comprises: a bracket 301, a retaining plate 302, a movable plate 303, a pressurizing cylinder 304, a piston rod 305, a adhesive sealant applying port (not shown in FIG. 2), a UV curing lamp (not shown in FIG. 2) etc. In order to implement the trimming process, that is, the nonparallelism of both substrates in the flat liquid crystal display substrate is forcibly corrected in a mechanical manner by rigid pressurizing, such that the liquid crystal sandwiched between various sections of the array substrate and the color filter substrate is even in thickness. The retaining plate 302 and the movable plate 303 of the trimming and sealing apparatus are both in a flat-plate configuration. The technology of using the trimming and sealing apparatus shown in FIG. 2 for trimming and sealing the flat liquid crystal display comprises: the retaining plate 302 is firstly employed to retain one of the substrates of the flat liquid crystal display, then the piston rod 305 of the pressurizing cylinder 304 drives the movable plate 303 to approach another substrate in the flat liquid crystal display and pressurize the another substrate; when a preset amount of liquid crystal has run from the injection mouth of the flat liquid crystal display, adhesive sealant is applied to the injection mouth of the flat liquid crystal display with the adhesive sealant applying port, and then the piston rod 305 of the pressurizing cylinder 304 drives the movable plate 303 away from the another substrate of the flat liquid crystal display, thus the applied adhesive sealant is pressed into the injection mouth by the atmosphere pressure; finally, the coated adhesive sealant is illuminated and thus cured with the UV curing lamp. In the embodiment of the present invention, similar to the above process of liquid crystal filling, when a liquid crystal display having a certain degree of curvature is manufactured, if the trimming and sealing apparatus as shown in FIG. 2 is employed for trimming and sealing the substrates, the process of trimming and sealing the bended assembled substrate may not be implemented since the retaining plate 302 and the movable plate 303 are both in a flat-plate configuration while both substrates of the bended assembled substrate is curved, and thus both substrates of the bended assembled substrate may be damaged. Therefore, the plate configurations of a certain degree of curvature (hereafter simply referred to as a curved pressing plate) is needed in the method of the embodiment of the present invention, for trimming and sealing the bended assembled substrate after the substrate is filled with liquid crystal; in order that the liquid crystal sandwiched between various sections of the array substrate and the color filter substrate of the bended assembled substrate is even in thickness, the curved pressing plate should have a same degree of curvature as that of the bended assembled substrate. It should be noted, for the purpose of trimming the curved array substrate and curved color filter substrate in the embodiment of the present invention, there should be two curved pressing plates located in a symmetrical arrangement, for example, a retaining plate of a certain degree of curvature (hereafter referred to as simply a curved retaining plate) and a movable plate of a certain degree of curvature (hereafter referred to as simply a curved movable plate) are arranged in pairs.

For example, the method of the embodiment of the present invention further comprises: combining the bended assembled substrate that has been trimmed and sealed with a backlight source.

For example, in the method of the embodiment of the present invention, the bended assembled substrate that has been trimmed and sealed is combined with the backlight source. For example, the bended assembled substrate that has been trimmed and sealed is aligned with the backlight source having a curved light guiding plate, wherein the curved light guiding plate has a same degree of curvature as that of the bended assembled substrate; the aligned bended assembled substrate is fixed with the backlight source having a curved light guiding plate.

For example, the bended liquid crystal display in the embodiment of the present invention has a certain degree of curvature, and if an existing backlight source directed to a flat liquid crystal display is used to afford backlight, uneven backlight will occurs in the bended liquid crystal display and thus influences picture quality. Because the light guiding plate in the existing backlight sources directed to a flat liquid crystal display is in a flat-plate configuration. Therefore, the backlight source having a curved light guiding plate is needed in the method of the embodiment of the present invention to provide backlight, and it's also needed that the curved light guiding plate has a same degree of curvature as that of the bended liquid crystal display.

It should be noted, in the method for manufacturing method a bended liquid crystal display provided by the embodiment of the present invention, the initial lengths and initial widths of the array substrate and the color filter substrate are different from each other, respectively. After thermal expansion and shrinking, the array substrate and the color filter substrate have a length and width of small difference from their length and width prior to the heating (that is, the initial length and width), and the degree of curvature of the resultant curved display is determined by the length and width of the resultant array substrate and color filter substrate. In this way, the degree of curvature of the resultant curved display can be determined by the initial length and width of both substrates. The initial length and initial width of both substrates should be different so that both substrates have a certain degree of curvature after the thermal expansion and shrinking process; furthermore, since the array substrate and the color filter substrate have different thermal expansion coefficients, the initial length and width of both substrates should also be different so that both substrates can expand to identical preset length and width.

In the method provided by the embodiment of the present invention, the glass sheets used for manufacturing the array substrate and the color filter substrate are all flat glass sheets, thus the present invention may for example employ the flat glass sheet materials commonly used in the existing display manufacturing technology, and mass manufacture of curved displays can be realized based on the existing raw materials and existing technologies with litter technical modifications, thus saving the manufacturing costs.

Correspondingly, the embodiment of the present invention further provides a bended liquid crystal display, comprising: an array substrate and a color filter substrate that have an identical degree of curvature and are made from flat glass sheets having different thermal expansion coefficients, as well as the liquid crystal sandwiched between the array substrate and the color filter substrate, and the bended liquid crystal display is made by the above method for manufacturing a bended liquid crystal display.

Figure 3:
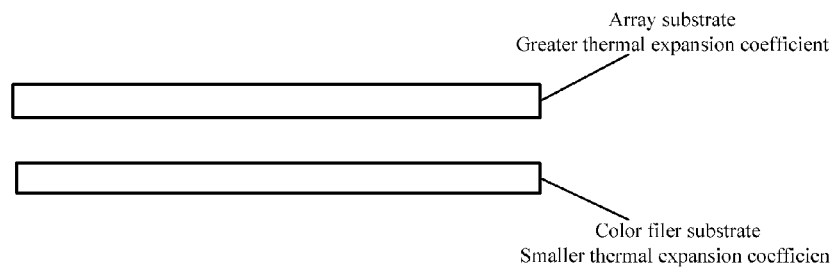
FIG. 3(a) is a structural schematic view for the two glass sheets in an cell-assembling process provided by an embodiment of the present invention.
FIG. 3(b) is a structural schematic view for a bended liquid crystal display provided by the embodiment of the present invention.
Figure 3:
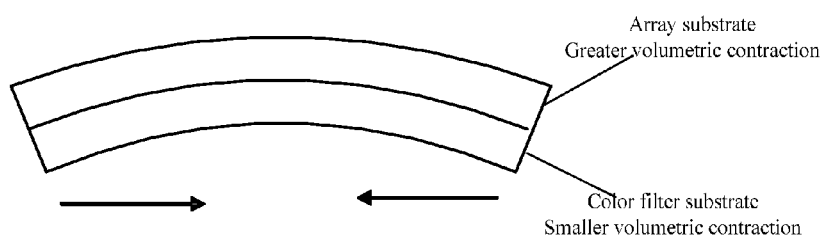
Figure 4:
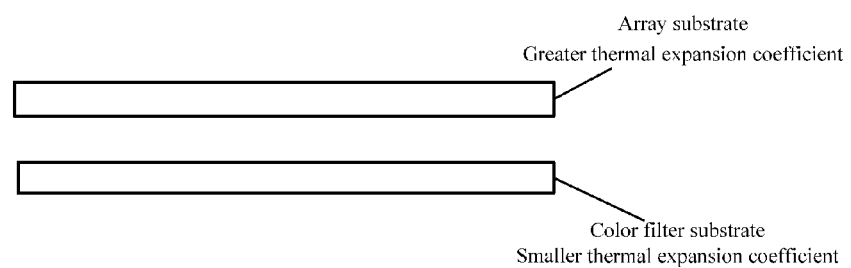
FIG. 4(a) is a structural schematic view for two glass sheets in another cell-assembling process provided by an embodiment of the present invention.
FIG. 4(b) is a structural schematic view for another bended liquid crystal display provided by the embodiment of the present invention.
Figure 4:
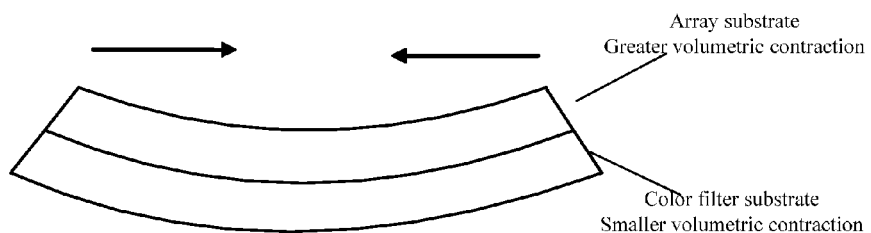

Specifically, with the above-described method for manufacturing the bended liquid crystal display, it's possible to manufacture a convex curved display or a concave curved display as desired. When the thermal expansion coefficient of the color filter substrate is greater than the thermal expansion coefficient of the array substrate, as shown in FIG. 3(a), both substrates are heated so as to expand to identical preset length and width, then aligned with each other and bound together to form a liquid crystal cell using adhesive sealant; as shown in FIG. 3(b), during the cooling process, duo to greater contraction of the color filter substrate and less contraction of the array substrate, a curved display convex to the array substrate is naturally formed under the action of stress. When the thermal expansion coefficient of the color filter substrate is less than that of the array substrate, as shown in FIG. 4(a), both substrates are heated so as to expand to identical preset length and width and then aligned with other and assembled to form a cell; as shown in FIG. 4(b), during the cooling process, duo to less contraction of the color filter substrate and greater contraction of the array substrate, a curved display concave to the array substrate is naturally formed under the action of stress.

Figure 5:
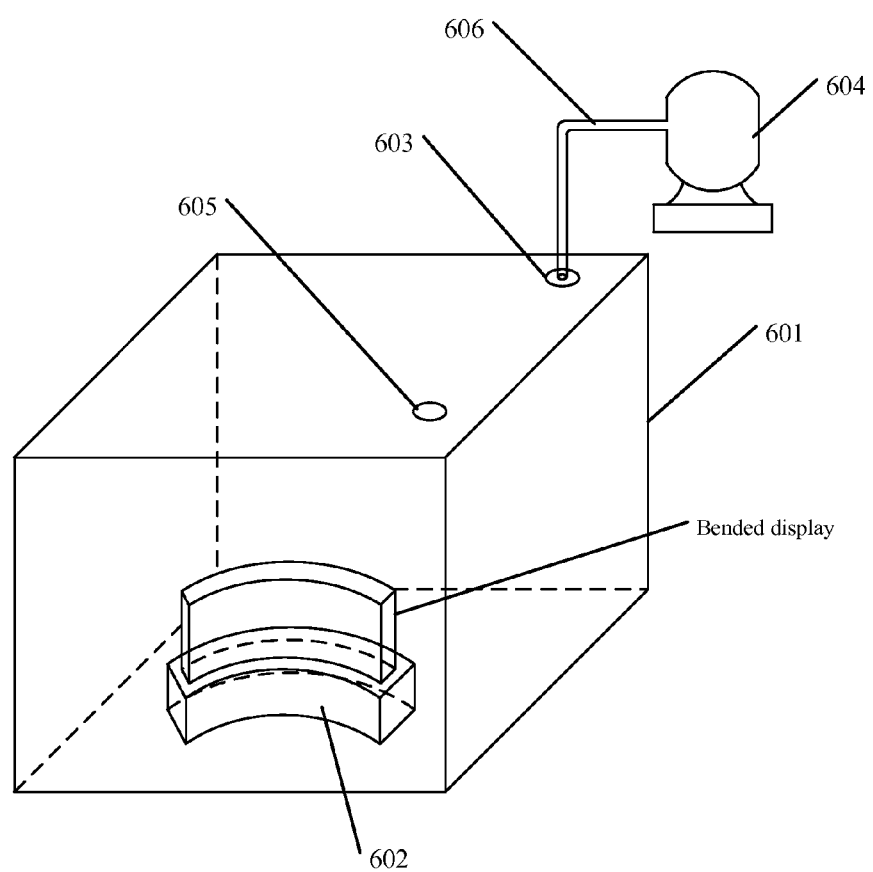
FIG. 5 is a structural schematic view for a liquid crystal filling apparatus provided by an embodiment of the present invention.

Another embodiment of the present invention also provides a liquid crystal filling apparatus, adapted for performing liquid crystal filling to the curved display, as shown in FIG. 5, which comprises: a liquid crystal filling case 601, a curved liquid crystal trough 602, an extraction hole 603, an air pump 604, a vent hole 605, an extracting pipe 606; the extraction hole 603 and the vent hole 605 are located at the body surface of the liquid crystal filling case 601, the curved liquid crystal trough 602 has a certain degree of curvature and is located within the liquid crystal filling case 601, and the air pump 604 is communicated with the liquid crystal filling case 601 through the extracting pipe 606 and the extraction hole 603.

The liquid crystal filling apparatus may have one or more curved liquid crystal troughs 602, each of which has a certain degree of curvature and a certain volume. Different curved liquid crystal troughs 602 may have identical degree of curvature and different volumes, or have different degrees of curvature and different volumes, or have different degree of curvature and identical volume. When the liquid crystal filling apparatus is employed for performing liquid crystal filling to the curved display substrate, a curved liquid crystal trough 602 of appropriate degree of curvature and volume may be selected based on the specific degree of curvature of the curved display substrate and the required volume of liquid crystal.

Liquid crystal filling can be performed for a curved display with the liquid crystal filling apparatus shown in FIG. 5, comprising the following steps.

Step A1, based on the degree of curvature of the curved display and the required volume of liquid crystal, selecting a suitable curved liquid crystal trough 602 and placing it into the liquid crystal filling case 61;

Step A2, performing an evacuation process for the liquid crystal filling case 601 with the air pump 604;

Step A3, placing the curved display to be filled with liquid crystal into the liquid crystal filling case 601, and immersing the injection mouth of the curved display into the curved liquid crystal trough 602 filled with liquid crystal; and Step A4, opening the vent hole 605 such that an appropriate amount of air enters the liquid crystal filling case 601 and then the liquid crystal within the curved liquid crystal trough 602 enters the curved display through the injection mouth by the atmosphere pressure and capillarity.

Figure 6:
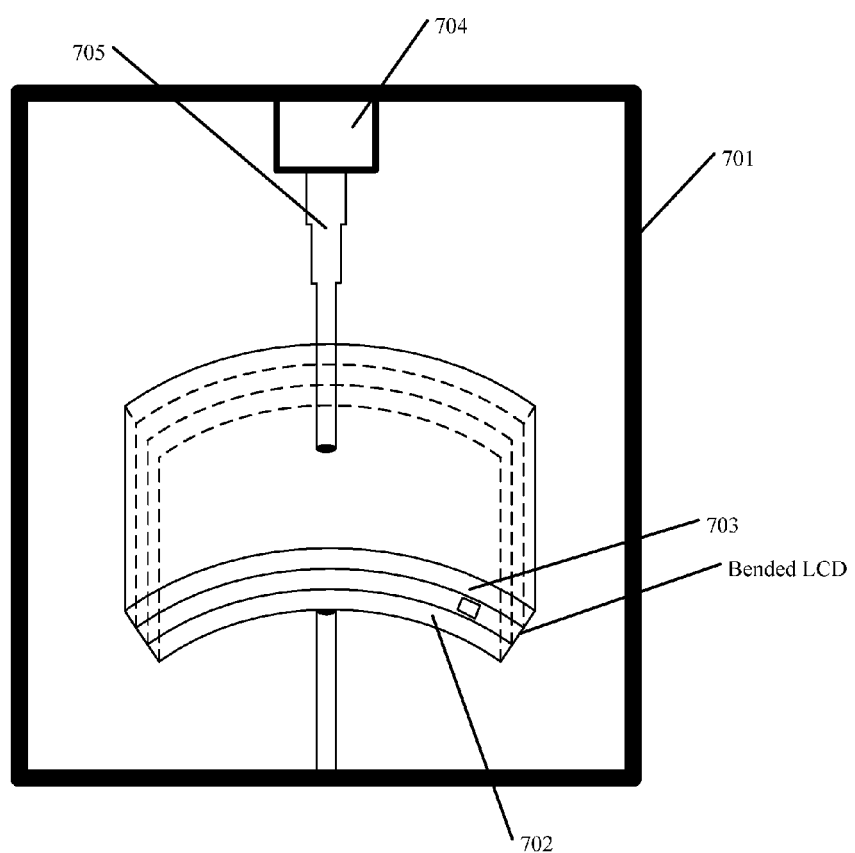
FIG. 6 is a structural schematic view for a trimming and sealing apparatus provided by an embodiment of the present invention.

Correspondingly, the present invention further provides a trimming and sealing apparatus, as shown in FIG. 6, comprising: a bracket 701, a curved retaining plate 702, a curved movable plate 703, a pressurizing cylinder 704, a piston rod 705, an adhesive sealant applying port (not shown in FIG. 6), and a UV curing lamp (not shown in FIG. 6); the curved retaining plate 702 is fixed onto the base of the bracket 701, the pressurizing cylinder 704 is fixed on the top of the bracket 701, the end of the piston rod 705 of the pressurizing cylinder 704 is fixed with the curved movable plate 703, and the curved movable plate 703 and the curved retaining plate 702 are arranged opposite to each other, and the adhesive sealant applying port and the UV curing lamp are installed on the bracket 701.

The curved retaining plate 702 and curved movable plate in the trimming and sealing apparatus are provided in pair, and have an identical degree of curvature and broadness magnitude; furthermore, the trimming and sealing apparatus may have pairs of curved retaining plate 702 and curved movable plate 703, and different pair of the curved retaining plate 702 and the curved movable plate 703 may or may not have a similar degree of curvature, and the broadness magnitude also may or may not be identical to each other. When the trimming and sealing apparatus is used to perform trimming and sealing onto the bended liquid crystal display, the curved retaining plate 702 and the curved movable plate 703 having an appropriate degree of curvature and appropriate broadness may be selected based on the specific degree of curvature and broadness magnitude of the bended liquid crystal display substrates.

The process of trimming and sealing the bended liquid crystal display using the trimming and sealing apparatus, for example, comprises the following steps.

Step B1, selecting a suitable curved retaining plate 702 and a suitable curved movable plate 703 depending on the degree of curvature and broadness magnitude of the bended liquid crystal display, and fixing vertically the selected curved retaining plate 702 onto the bracket 701 and fixing the selected curved movable plate 703 at the end of the piston rod 705 of the pressurizing cylinder 704;

Step B2, supporting one substrate of the bended liquid crystal display (the array substrate or the color filter substrate) using the curved retaining plate 702; Step B3, starting the pressurizing cylinder 704 such that the piston rod 705 drives the curved movable plate 703 to approach the other substrate of the bended liquid crystal display and press this substrate; Step B4, when a preset amount of liquid crystal runs out from the injection mouth of the bended liquid crystal display, applying the injection mouth with adhesive sealant using the adhesive sealant applying port; Step B5, closing the pressurizing cylinder 705 such that the piston rod 705 drives the movable plate 703 away from the other substrate of the bended liquid crystal display and the applied adhesive sealant is pressed into the injection mouth under the atmosphere pressure; and Step B6, illuminating and curing the applied adhesive sealant using the UV curing lamp.

Figure 7:
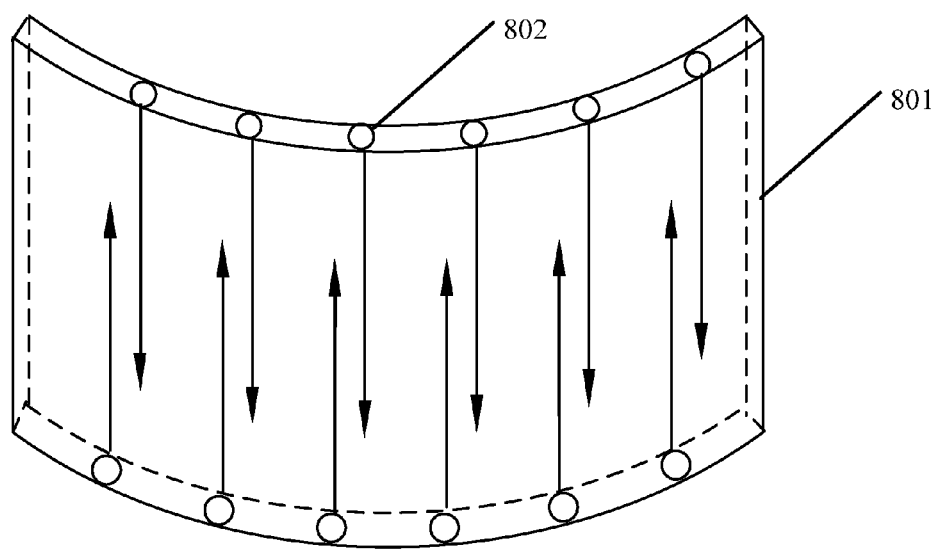
FIG. 7 is a structural schematic view for a backlight source provided by an embodiment of the present invention.

Correspondingly, an embodiment of the present invention further provides a backlight source, adapted for providing backlight for the bended liquid crystal display, as shown in FIG. 7. The backlight source comprises: a curved light guiding plate 801, a plurality of light-emitting diodes (LEDs) 802, a plurality of heat radiators (not shown in FIG. 7), and a circuit unit (not shown in FIG. 7). The curved light guiding plate 801 have a same degree of curvature and broadness magnitude as that of the bended liquid crystal display, and for example, may be made from a resin material. The LEDs 802 are evenly mounted at the circumference of the curved light guiding plate 801 so as to ensure that the backlight supplied to the bended liquid crystal display can be throughout the whole display regularly. The number of the LEDs 802 may be appropriately arranged as required, to avoid the situations where a less number of LEDs provide backlight of too low brightness or a greater number of LEDs provide backlight of too high brightness. The number of the heat radiators should be consistent with that of the LEDs 802, and each heat radiator corresponds to one LED 802 and is mounted at the preset region around the LED 802; and the circuit unit is connected with the LED 802 and heat radiator, respectively.

The process for providing the bended liquid crystal display with a backlight source as shown in FIG. 7 may be performed as follows.

Firstly, the bended assembled substrate that has been trimmed and sealed is aligned with the curved light guiding plate of the backlight source; then, the bended assembled substrate and the curved light guiding plate that are aligned are fixed together with metal or adhesive.

It should be noted that, in the field of liquid crystal display, backlight sources can be divided into a direct-light-type backlight system and edge-light-type backlight system. The direct-light-type backlight system means that a plurality of light sources right behind the liquid crystal panel provide backlight for the liquid crystal panel; the edge-light-type backlight system means that light sources located at a side provide backlight for the liquid crystal panel. The backlight source of the embodiment of the present invention, as shown in FIG. 7, is an edge-light-type backlight system, and the reason is that the bended liquid crystal display provided by the embodiment of the present invention has a certain degree of curvature, and if a direct-light-type backlight system is used, the normal display effect of the bended liquid crystal display will be disadvantageously affected because the plurality of light sources behind the liquid crystal panel can not provide even backlight throughout the whole screen. With the edge-light-type backlight system having a curved backlight plate (such as, the backlight as shown in FIG. 7), due to the fact that the curved backlight plate has a same degree of curvature as that of the bended liquid crystal display, the light source at the side of the curved light guiding plate may provide even backlight throughout the whole screen of the bended liquid crystal display, thus guaranteeing the regular display effect of the bended liquid crystal display.

The above described are only exemplary embodiments of the present invention, but not intend to limit the protection scope of the present invention; and the protection scope of the present invention is defined by the appended claims.

The invention claimed is:

1. A method for manufacturing a bended liquid crystal display, comprising:
preparing an array substrate with a flat glass sheet having a first thermal expansion coefficient and preparing a color filter substrate with a flat glass sheet having a second thermal expansion coefficient, the first thermal expansion coefficient being different from the second thermal expansion coefficient;
applying adhesive sealant at edges of surfaces of the array substrate and/or the color filter substrate;
heating the array substrate and the color filter substrate, and when it's determined that both the array substrate and the color filter substrate have been subjected to thermal expansion and reach a same predetermined length and width, binding the expanded array substrate and color filter substrate together with the adhesive sealant so as to form an assembled substrate; and
cooling the assembled substrate and forming a bended assembled substrate having a degree of curvature;
filling liquid crystal into the bended assembled substrate with a liquid crystal filling apparatus having a curved liquid crystal trough, wherein the curved liquid crystal trough has trough walls of a preset degree of curvature;
wherein the preset degree of curvature is the same as the degree of curvature of the bended assembled substrate.

2. The method according to claim 1, wherein the adhesive sealant is thermosetting adhesive sealant.

3. The method according to claim 1, wherein a heating temperature is in a range of 80-300 degrees Celsius.

4. The method according to claim 1, wherein the process of binding the expanded array substrate and color filter substrate together with the adhesive sealant to form the assembled substrate comprises:
aligning an alignment mark on the expanded array substrate to an alignment mark on the expanded color filter substrate; and
binding the expanded array substrate and color filter substrate together with the adhesive sealant to form the assembled substrate.

5. The method according to claim 1, further comprising: trimming and sealing the bended assembled substrate after filling of liquid crystal into the bended assembled substrate.

6. The method according to claim 5, wherein the process of trimming and sealing the bended assembled substrate after filling of liquid crystal into the bended assembled substrate comprises:
trimming and sealing the bended assembled substrate after filling of liquid crystal with a trimming and sealing apparatus having a curved pressing plate, wherein the curved pressing plate has a same degree of curvature as that of the bended assembled substrate.

7. The method according to claim 5, further comprising: combining the bended assembled substrate after trimming and sealing with a backlight source.

8. The method according to claim 7, wherein the process of combining the bended assembled substrate after trimming and sealing with a backlight source comprises:
aligning the bended assembled substrate after trimming and sealing with the backlight source having a curved light guiding plate, wherein the curved light guiding plate has a same degree of curvature as that of the bended assembled substrate; and fixing the aligned bended assembled substrate and the backlight source having the curved light guiding plate together.

9. A bended liquid crystal display which is manufactured by the method according to claim 1, comprising: an array substrate and a color filter substrate which have an identical degree of curvature and are made from flat glass sheets having different thermal expansion coefficients, as well as liquid crystal sandwiched between the array substrate and the color filter substrate.

* * * * *